United States Patent [19]
Takaki

[11] Patent Number: 5,835,234
[45] Date of Patent: Nov. 10, 1998

[54] FACSIMILE MODEM AND DATA PROCESSING METHOD

[75] Inventor: Kazuyuki Takaki, Kawasaki, Japan

[73] Assignee: Fujitsu Limited, Kawasaki, Japan

[21] Appl. No.: 449,590

[22] Filed: May 24, 1995

[30] Foreign Application Priority Data

May 24, 1994 [JP] Japan .................................. 6-108881

[51] Int. Cl.⁶ .............................. H04N 1/00; H04N 1/32; H04M 11/00
[52] U.S. Cl. ......................... 358/404; 358/468; 358/442; 379/100.08; 379/100.15
[58] Field of Search .................................. 358/400, 404, 358/407, 468, 440, 434, 435, 438, 439, 402, 442; 375/222; 455/49.1; 379/100.01, 100.06, 100.08, 100.09, 100.12, 100.15

[56] References Cited

U.S. PATENT DOCUMENTS

| | | | |
|---|---|---|---|
| 5,159,466 | 10/1992 | Haneda et al. | 358/434 |
| 5,291,302 | 3/1994 | Gordon et al. | 358/404 |
| 5,392,132 | 2/1995 | Yamamoto et al. | 358/407 |
| 5,450,530 | 9/1995 | Snyder et al. | 375/222 |
| 5,513,212 | 4/1996 | Bremer | 375/222 |
| 5,644,593 | 7/1997 | Bailey et al. | 375/222 |

*Primary Examiner*—Kim Yen Vu
*Assistant Examiner*—Kimberly A. Williams
*Attorney, Agent, or Firm*—Staas & Halsey

[57] ABSTRACT

In a facsimile modem connectable to a terminal and equipped with a function of transmitting and receiving different types of data including facsimile data, there are provided a memory, and a controller which controls the memory so that data received from a remote communications party is stored in the memory when the terminal is not ready to receive data.

16 Claims, 9 Drawing Sheets

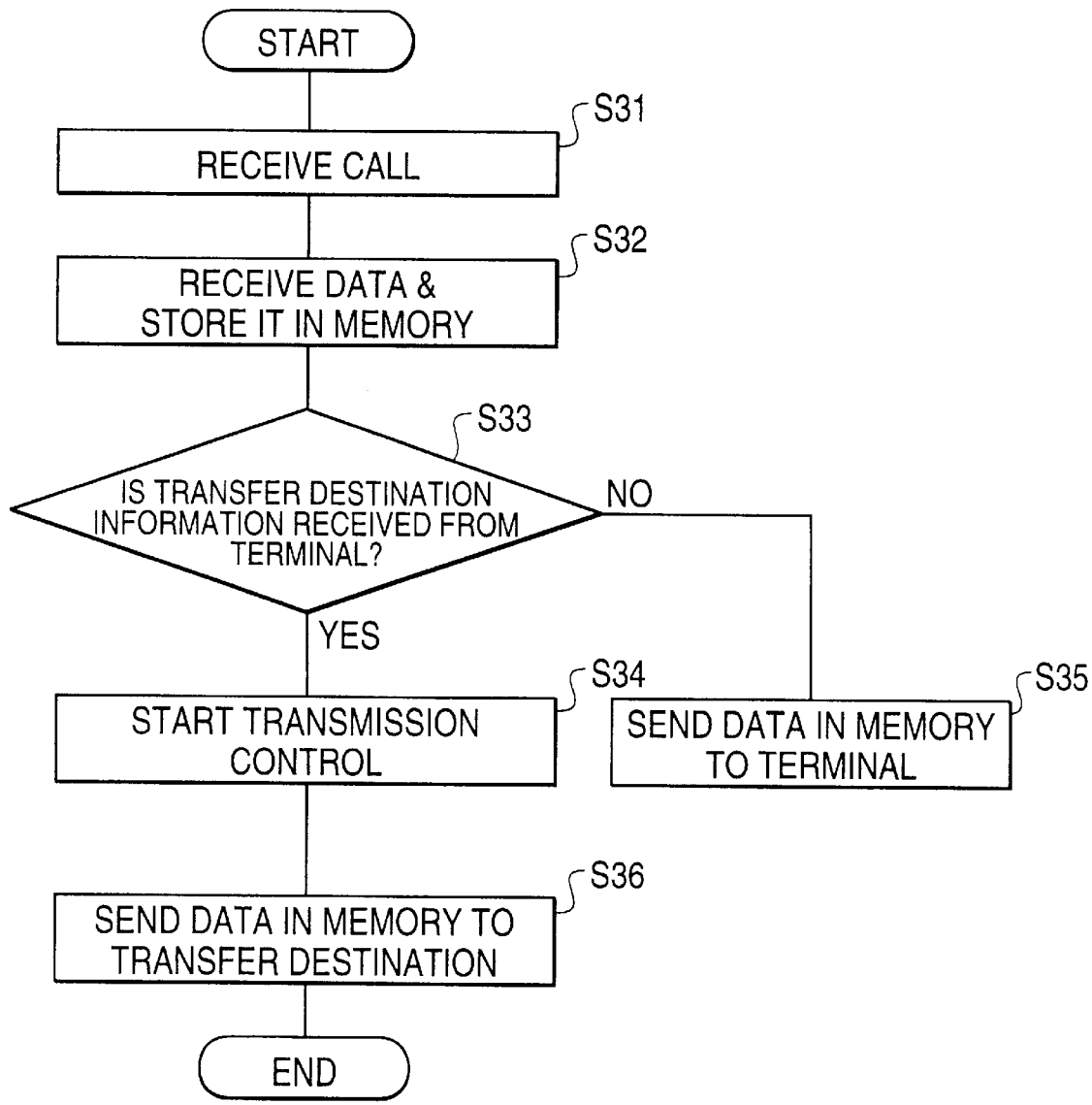

FACSIMILE MODEM AND DATA PROCESSING METHOD

BACKGROUND OF THE INVENTION

1. Field of the Invention

The present invention generally relates to facsimile modems, and more particularly to a facsimile modem, which can deal with ordinary data processed by terminal equipment as well as facsimile data.

Generally, a data modem used for communications with terminal equipment such as personal computers cannot communicate with a facsimile modem. This is because the data modem handles data having a format different from that of data processed by the facsimile modem, and performs an error process and a data transmission in ways which are different from those of the facsimile modem. However, the data modem is functionally similar to the facsimile modem. Hence, recently, a facsimile modem has been proposed and actually manufactured. The facsimile modem is a data modem which is incorporated with the facsimile function and is capable of communicating with a remote facsimile machine.

Recently, image information and text information have been translated into electronic data. Under the above circumstance, it is increasingly required that terminals have communicating functions via facsimile modems. In order to associate the terminals with facsimile modems, it is necessary for the terminals to perform both the ordinary data communications protocol and the facsimile communications protocol. That is, the terminals are needed to have an increased load.

2. Description of the Prior Art

FIG. 1 is a block diagram of a prior art example. A terminal 12 is a personal computer into which software for communications has been installed. The terminal 12 is capable of communicating with a remote communications party 14 via a facsimile (FAX) modem 13 and a communications network. The facsimile modem 13 is capable of transmitting and receiving ordinary data and facsimile data. The remote communications party 14 is, for example, a facsimile machine, a facsimile modem, a data modem or the like. For example, the remote communications party 14 is configured in the same way as shown by a block indicated by the broken line. A block depicted by the broken line denotes one side of the transmission medium opposite to the side thereof on which the remote party 14 is located.

The facsimile modem 13 has only a modulation and demodulation function, which is realized by a modem part of an ordinary facsimile machine. This means that the terminal 12 perform control operations other than the modulation and demodulation function. For example, the terminal 12 functions to input data to be transmitted and to output received data, and the terminal 12 functions to perform an encoding and decoding process and a facsimile transmission procedure.

However, the prior art shown in FIG. 1 has the following disadvantages.

First, when the terminal 12 connected to the facsimile modem 13 is not activated, the facsimile modem 13 cannot receive data from the remote communications party 14.

Second, when the remote communications party 14 coupled to the facsimile modem 13 via the network is busy, the terminal 12 must hold its state in the standby mode until the remote communications party 14 terminates the communication. In the standby mode, the terminal 12 does not perform another task.

Third, when the terminal 12 connected to the facsimile machine 13 transfers data received from the remote communications party 14 to another remote party, it is necessary to perform a necessary transfer process in the terminal 12 connected to the facsimile modem 13.

SUMMARY OF THE INVENTION

It is a general object of the present invention to provide a facsimile modem and a data processing method in which the above disadvantages are eliminated.

A more specific object of the present invention is to provide a facsimile machine which has a capability of reducing the time exclusively using an associated terminal to thereby make it possible to utilize the associated terminal more efficiently.

The above objects of the present invention are achieved by a facsimile modem connectable to a terminal and equipped with a function of transmitting and receiving different types of data including facsimile data, the facsimile modem comprising:

a memory; and a controller which controls the memory so that data received from a remote communications party is stored in the memory when the terminal is not ready to receive data.

The above objects of the present invention are also achieved by a facsimile modem connectable to a terminal and equipped with a function of transmitting and receiving different types of data including facsimile data, the facsimile modem comprising:

a memory; and a controller which controls the memory so that data to be transmitted to a remote communications party by the terminal is stored in the memory when the remote communications party is not ready to receive data.

The above objects of the present invention are also achieved by a facsimile modem connectable to a terminal and equipped with a function of transmitting and receiving different types of data including facsimile data, the facsimile modem comprising:

a memory; and a controller which controls the memory so that data received from a first remote communications party is stored in the memory and which transfers the data stored in the memory to a second remote communications party when the data stored in the memory is requested to be transferred to the second remote communications party.

The above objects of the present invention are also achieved by a data processing method for processing data in a facsimile modem connectable to a terminal and equipped with a function of transmitting and receiving different types of data including facsimile data, the data processing method comprising the steps of:

determining whether the terminal is ready to receive data; and storing data received from a remote communications party in a memory provided in a facsimile modem when it is determined that the terminal is not ready to receive data.

The above objects of the present invention are also achieved by a data processing method for processing data in a facsimile modem connectable to a terminal and equipped with a function of transmitting and receiving different types of data including facsimile data, the data processing method comprising the steps of:

determining whether a remote communications party to which the terminal has a request to send data is ready to receive data;

storing the data received from the terminal in a memory provided in a facsimile modem when it is determined that the remote communications party is not ready to receive data; and sending the data stored in the memory to the remote communications party when it is determined that the remote communications party is ready to receive data.

The above objects of the present invention are also achieved by a data processing method for processing data in a facsimile modem connectable to a terminal and equipped with a function of transmitting and receiving different types of data including facsimile data, the data processing method comprising the steps of:

storing data received from a first remote communications party in a memory provided in a facsimile modem;

determining whether a request to transfer the data stored in the memory to a second remote communications party; and transferring the data stored in the memory to the second remote communications party when the request is received.

BRIEF DESCRIPTION OF THE DRAWINGS

Other objects, features and advantages of the present invention will become more apparent from the following detailed description when read in conjunction with the accompanying drawings, in which:

FIG. 9 is a flowchart of a process for the third operation of the facsimile modem.

DESCRIPTION OF THE PREFERRED EMBODIMENT

A description will now be given of an embodiment of the present invention.

Figure 1:
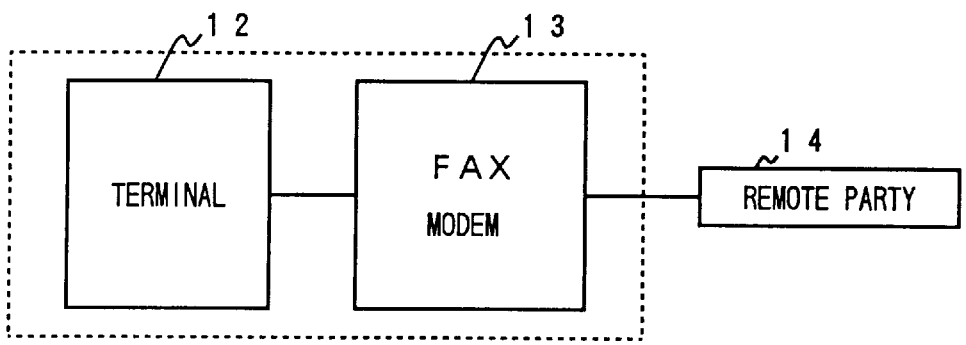
FIG. 1 is a block diagram of a communications system including a conventional facsimile modem.
Figure 2:
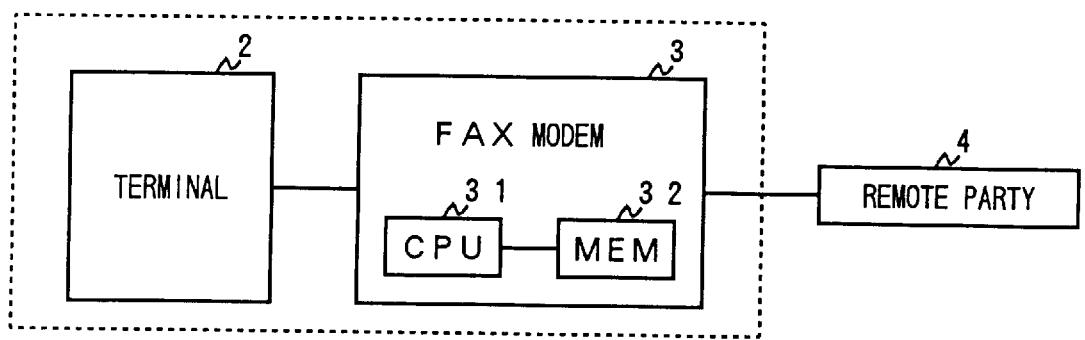
FIG. 2 is a block diagram of an outline of an embodiment of the present invention.

FIG. 2 is a block diagram of an outline of the embodiment of the present invention. A terminal 2 such as a personal computer, is coupled to a remote communications party 4 via a facsimile modem 3 and a communications medium such as a network. The facsimile modem 3 has the function of receiving and transmitting ordinary data (data modem data) and facsimile data. The facsimile modem 3 has a processor 31 such as a CPU (Central Processing Unit) or a microprocessor, and a memory 32. The memory 32 is used to store received or transmitted data (data modem data and facsimile data). The CPU 31 controls the overall facsimile modem 3.

When the terminal 2 communicates with the remote communications party 4 such as a facsimile machine, a facsimile modem or a data modem, data to be transmitted or data received can be temporarily stored in the memory 32 under the control of the CPU 31. Memory 32 can be used as a buffer that stores data received from the remote communications party 4 and data to be supplied from the terminal 2 and transmitted. Thus, the CPU 31 of the facsimile modem 3 can control, instead of the terminal 2 connected thereto, a receiving process and a transmitting process. As a result, the terminal 12 is no longer needed to perform the data receiving and transmitting processes which are carried out by the CPU 31 of the facsimile modem 3, and has a reduced load of processing.

Figure 3:
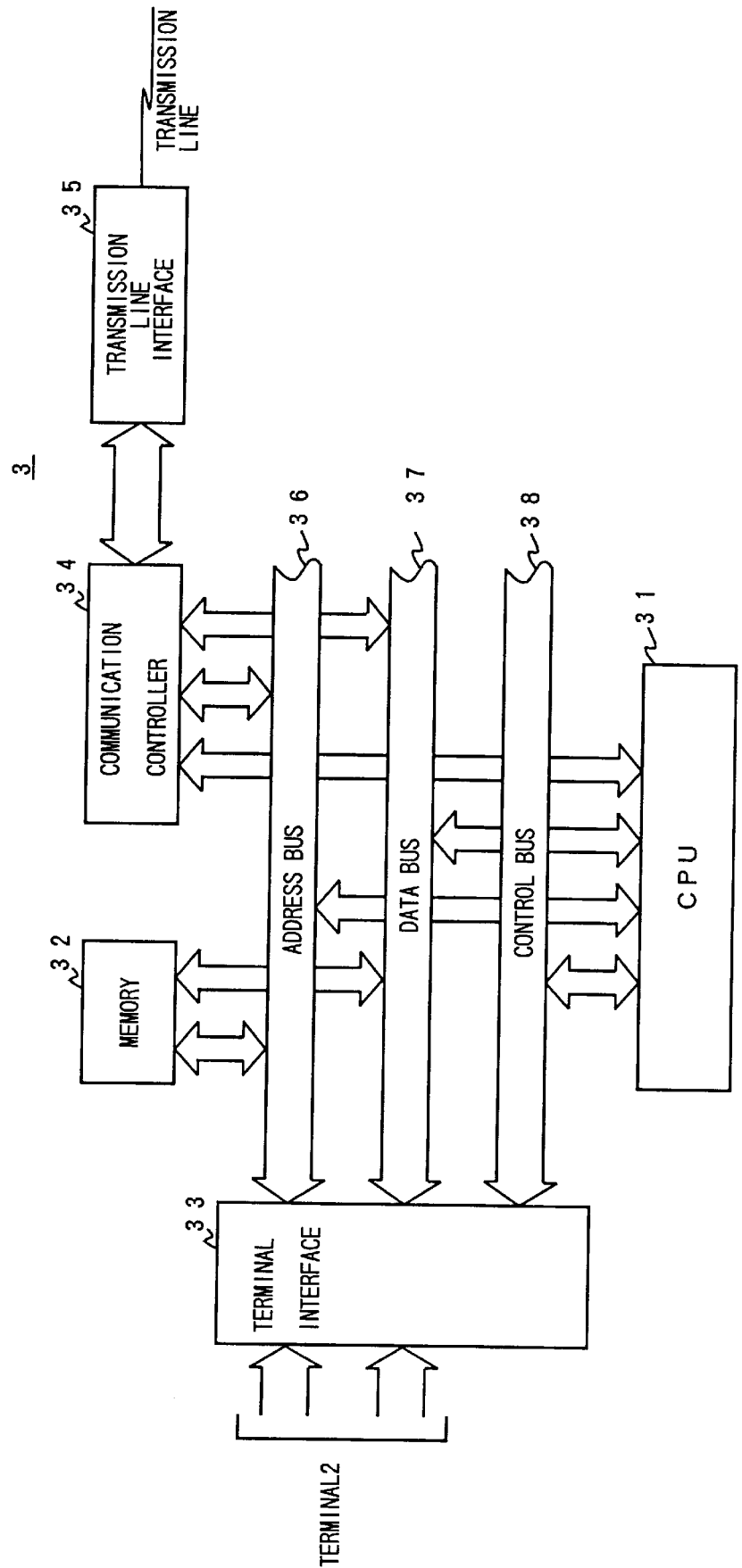
FIG. 3 is a block diagram of a facsimile modem shown in FIG. 2.

FIG. 3 is a block diagram of the facsimile modem 3 shown in FIG. 2. The facsimile modem 3 shown in FIG. 3 includes, in addition to the CPU 31 and the memory 32, a terminal interface unit 33, a communication controller 34, a transmission line interface unit 35, an address bus 36 and a data bus 37. The terminal interface unit 33 establishes an interface between the terminal 2 and the facsimile modem 3. The unit 33 is disposed between an address bus from the terminal 2 and an address bus 36 and between a data bus from the terminal 2 and a data bus 37. The interface unit 33 also establishes an interface between a control bus extending from the terminal 2 and a control bus 38 of the facsimile modem 3.

The communication controller 34 has a first modulating and demodulation function for ordinary data and a second modulating and demodulating function for facsimile data. These functions may include respective data compression and decompression procedures. The communication controller 34 operates under the control of the CPU 31. The transmission line interface 35 establishes an interface between the facsimile modem 3 and a transmission line. The CPU 31 controls the overall facsimile modem 3, as will be described below.

The facsimile modem 3 has a power supply system separated from that of the terminal 2. That is, the facsimile modem 3 can operate irrespective of whether power supply to the terminal 2 is ON or OFF.

A description will now be given of the operation of the embodiment of the present invention.

Figure 4:
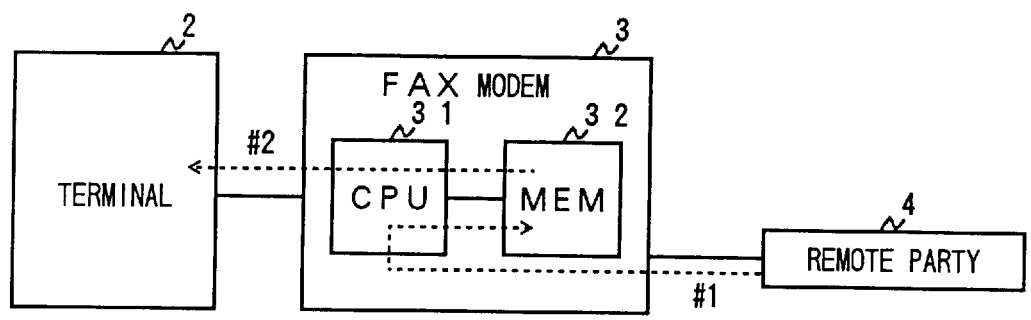
FIG. 4 is a block diagram showing a first operation of the facsimile modem.

FIG. 4 shows a first operation, which is a data receiving operation to be performed when the terminal 2 is not ready to receive data. For example, the terminal 2 cannot receive data when power supply to the terminal 2 is OFF or the terminal is processing a job. In this case, data transmitted by the remote communications party 4 is temporarily stored in the memory 32 under the control of the CPU 31 (#1). When the terminal 2 becomes ready to receive data, the CPU 31 transfers the received data in the memory 32 to the terminal 2 (#2). In the above way, the data can be received as long as the facsimile modem 3 is in the activated state irrespective of whether the terminal 2 is ON or OFF.

Figure 5:
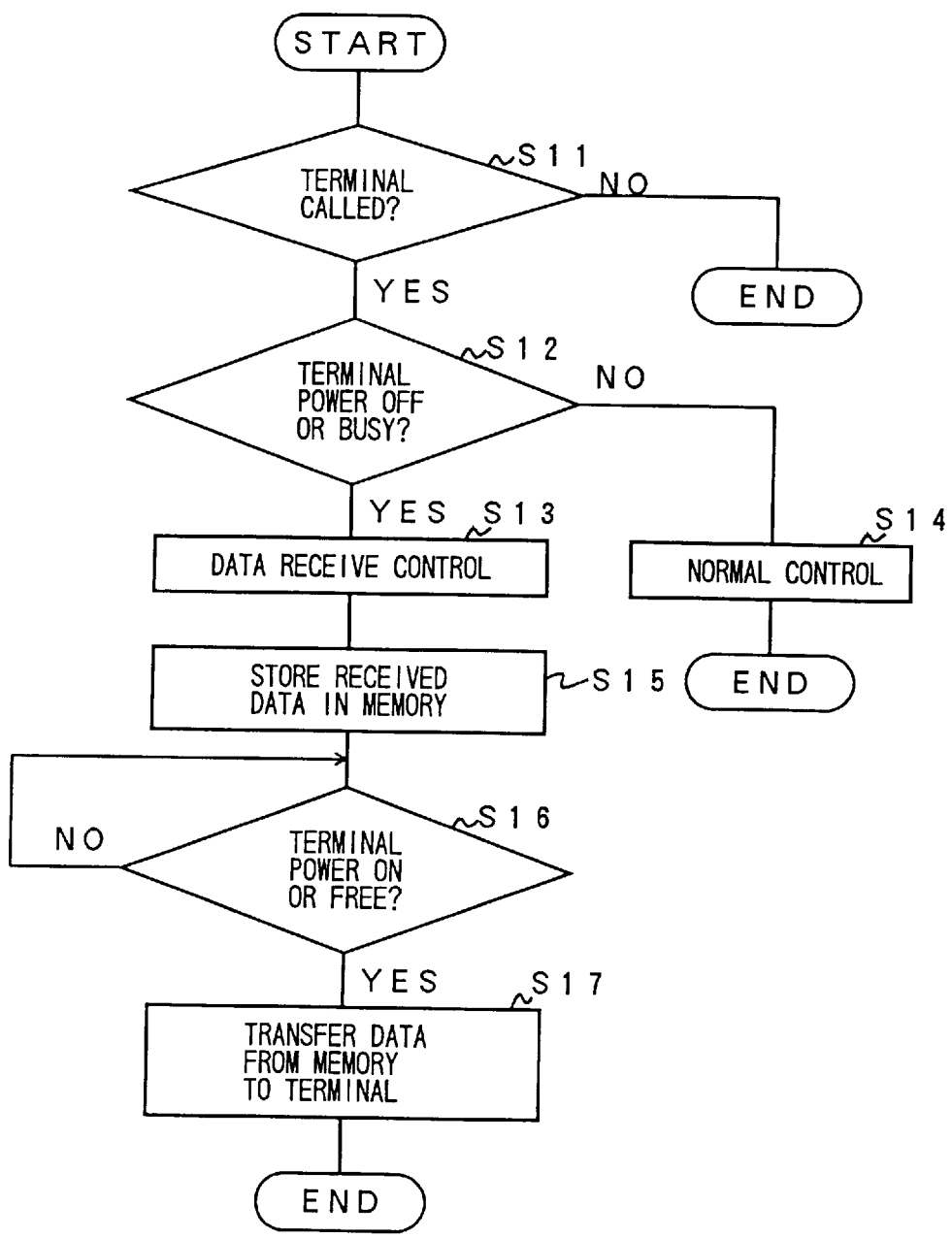
FIG. 5 is a flowchart of a process for the first operation shown in FIG. 4.

FIG. 5 is a flowchart of the process for realizing the above first operation carried out by the CPU 31 of the facsimile modem 3. In step S11, the CPU 31 determines whether or not the terminal 2 is called, for example, by the remote party 4. When the answer is NO, the process is ended. When the answer is YES, the CPU 31 discerns, in step S12, whether or not the terminal is OFF or busy and thus can not prepare a related communications program. When the result in step S12 is NO, data received via the transmission line is transferred to the terminal 2 by the normal control process in step S14. When the result in step S12 is YES, the CPU 31 performs a data receiving control in step S15, and stores the received data in the memory 32 in step S15. In this way, all received data is stored in the memory 32.

In step S16, the CPU 32 determines whether the terminal 2 is ready to receive data by checking whether the terminal 2 is ON or free. The CPU 32 repeatedly executes step S16 until the result of step S16 is affirmative. Then, the CPU 32 transfers the received data stored in the memory 32 to the terminal 2 in step S17. Then, the CPU 31 ends the process.

Figure 6:
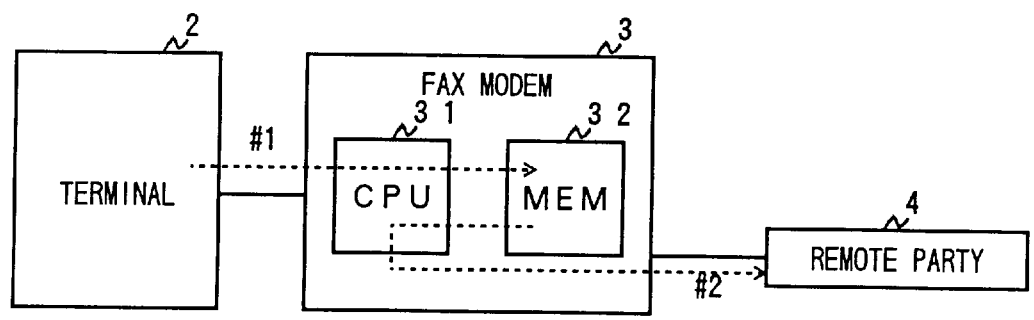
FIG. 6 is a block diagram showing a second operation of the facsimile modem.

FIG. 6 is a diagram showing a second operation of the embodiment of the present invention. The second operation is performed when the remote communications party 4 is busy and data from the terminal 2 cannot be transmitted thereto.

In response to a request for data transmission from the terminal 2, the CPU 31 calls the remote party 4 and learns that it is busy. In this case, data to be transmitted to, and the identification number of, the remote party 4 are transferred to and stored in the memory 32 under the control of the CPU 31 (#1). Then, the CPU 31 calls the remote party 4 again by referring to the identification number stored in the memory 32. If calling of the remote party 4 is successful, the data stored in the memory 32 is read therefrom and transmitted to the remote party 4 (#2). It will be noted that the terminal 2 can perform another job after transferring all data to be transmitted and the remote party identifier.

Figure 7:
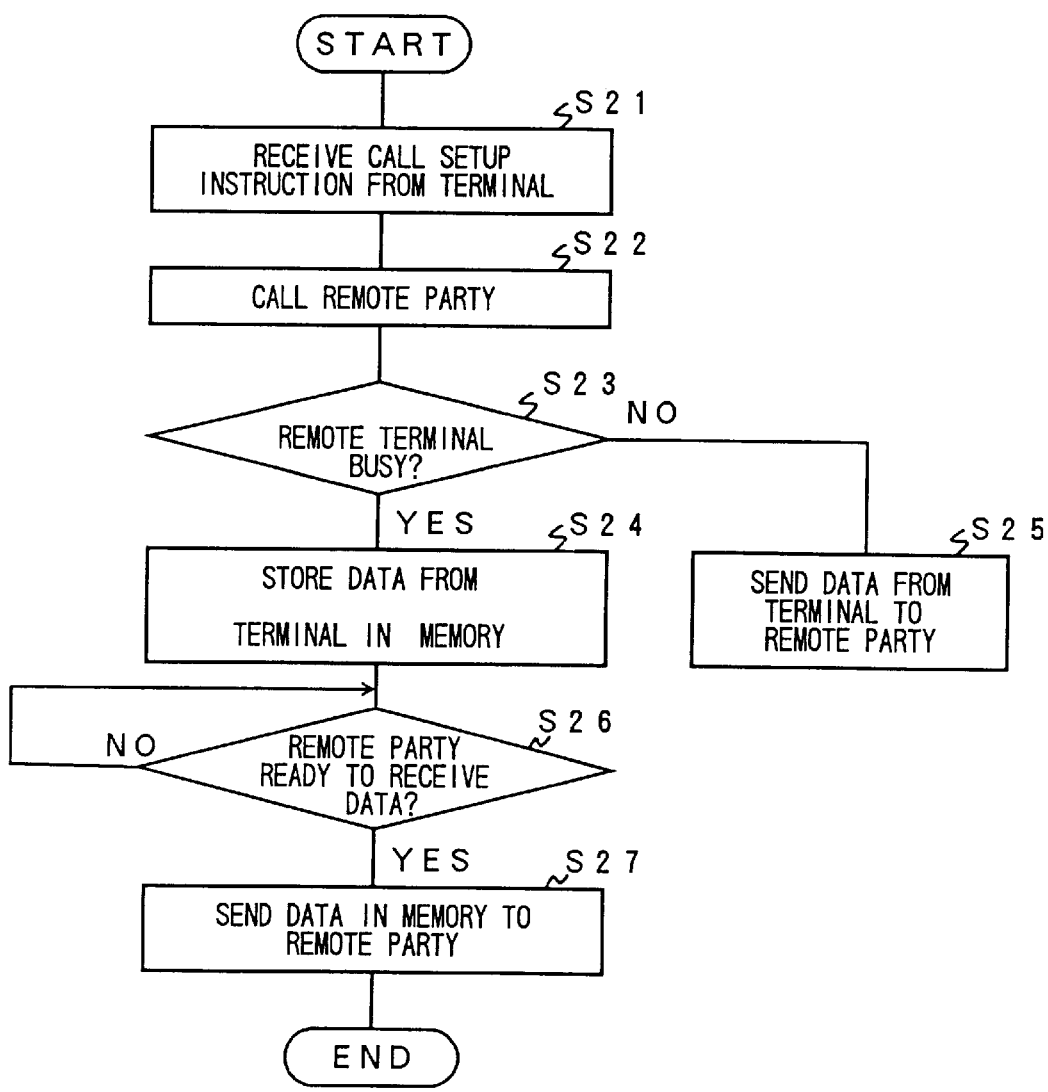
FIG. 7 is a flowchart of a process for the second operation shown in FIG. 6.

FIG. 7 is a flowchart of the process for realizing the second operation executed by the CPU 31. In step S21, the CPU 31 receives a call setup request from the terminal 2. In step S22, the CPU 31 calls the remote party 4 identified in the call setup request. In step S23, the CPU 31 determines whether or not the remote party 4 is busy. When the result of the step S23 determination is NO, the CPU 32 sends the transmission data received from the terminal 2 to the remote party 4 by the normal process in step S25. When the result of the step S23 determination is YES, the CPU 32 makes the data from the terminal 2 stored in the memory 32 in step S24. In this case, the identification number of the remote party 4 is also stored in the memory 32.

In step S26, the CPU calls the remote party 4 again and makes a decision as to whether the remote party 4 is now ready to receive data (not busy). When the result of this step is YES, the CPU 31 reads the data from the memory 32 and sends it to the remote party 4 in step S27.

Figure 8:
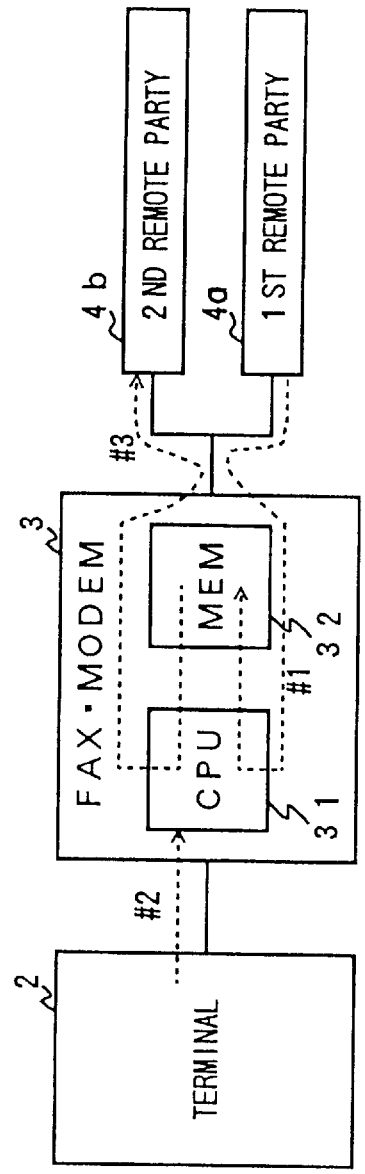
FIG. 8 is a block diagram showing a third operation of the facsimile modem.

FIG. 8 is a diagram of a third operation of the embodiment of the present invention. The third operation is performed when it is requested to transfer data from a first remote communications party 4a to a second remote communications party 4b. In the prior art, the data from the first remote party 4a is temporarily stored in a memory of the terminal 2 and is then transferred to the second remote party 4b. According to the present embodiment, the data from the first remote party 4a is transferred to the second remote party 4b without storing it in the memory of the terminal 2.

When it is requested to transfer data from the first remote party 4a to the second remote party 4b, the received data is temporarily stored in the memory 32 under the control of the CPU 31 (#1). When the terminal 2 has a request to transfer the received data to the second remote party 4b, it sends the destination information (identification number of the second remote party 4b) to the CPU 31 (#2). The CPU 31 calls the specified remote party 4b, and transfers the data stored in the memory 32 to the second remote party 4b. It is to be noted that the terminal 2 sends only the identification number of the remote party 4b to the CPU 31 and is not needed to store the data in the memory thereof.

FIG. 9 is a flowchart of the process for realizing the third operation. In step S31, the CPU 31 receives a call from a remote party such as the first remote party 4a. In step S32, the CPU 31 stores the received data in the memory 32. In step S33, the CPU 31 determines whether the received data should be transferred to another remote party such as the second remote party 4b. This decision is made by referring to the data transfer request. issued by the terminal 2 in response to receipt of a notification from the CPU 31 indicating that the data is received. When the result of step S33 is NO, the CPU 35 transfers the stored data to the terminal 2 in step S35. When the result of step S33 is YES, the CPU 31 starts the transmission control in step S34, and calls the specified remote party 4b. Then, the CPU 31 sends the data stored in the memory 32 to the remote terminal 4b in step S36.

The present invention is not limited to the specifically disclosed embodiment, and variations and modifications may be made without departing from the scope of the present invention.

What is claimed is:

1. A facsimile modem, connectable to a terminal, for receiving data, said facsimile modem comprising:
   a memory; and
   a controller controlling the memory so that data received from a remote communications party is stored in the memory when the terminal is not ready to receive data.

2. A facsimile modem, connectable to a terminal, for transmitting data, said facsimile modem comprising:
   a memory; and
   a controller controlling the memory so that data to be transmitted to a remote communications party by the terminal is stored in the memory when the remote communications party is not ready to receive data.

3. A facsimile modem, connectable to a terminal, for transmitting and receiving data, said facsimile modem comprising:
   a memory; and
   a controller controlling the memory so that data received from a first remote communications party is stored in the memory, the controller sending a notification to the terminal indicating data is received and transferring the data stored in the memory to a second remote communications party, without passing through the terminal, when the data stored in the memory is requested by the terminal to be transferred to the second remote communications party.

4. A data processing method for processing data in a facsimile modem connectable to a terminal for receiving data, said data processing method comprising the steps of:
   determining whether the terminal is ready to receive data; and
   storing data received from a remote communications party in a memory provided in the facsimile modem when it is determined that the terminal is not ready to receive data.

5. A data processing method for processing data in a facsimile modem, connectable to a terminal, for transmitting data, said data processing method comprising the steps of:
   determining whether a remote communications party, to which the terminal has a request to send data, is ready to receive data;
   storing the data received from the terminal in a memory provided in the facsimile modem when it is determined that the remote communications party is not ready to receive data; and sending the data stored in the memory to the remote communications party when it is determined that the remote communications party is ready to receive data.

6. A data processing method for processing data in a facsimile modem, connectable to a terminal, for transmitting and receiving data, said data processing method comprising the steps of:

storing data received from a first remote communications party in a memory provided in the facsimile modem;

notify the terminal that data is received;

determining whether the terminal has produced a request to transfer the data stored in the memory to a second remote communications party; and in response to the request produced by the terminal, transmitting the data stored in the memory to the second remote communications party without passing through the terminal.

7. A communications system, comprising:

a terminal; and a facsimile modem, the facsimile modem further comprising:

a memory, and a controller selectively responsive to and controlling the processing of at least one of:

(a) data received from a remote source and which is to be transmitted to the terminal, the controller storing the received data in the memory when the terminal is not ready to receive the data, (b) data received from the terminal and which is to be transmitted to a remote facsimile modem designated by the terminal, the controller storing the received data in the memory when the remote facsimile terminal is not ready to receive the data, and (c) data received from a remote source and which is to be transmitted, without passing through the terminal, to a remote facsimile modem, the controller storing the received data in the memory and sending a notification to the terminal indicating the data is received and further, in response to a request from the terminal to transmit the received and stored data to the designated remote facsimile modem, transmitting the received and stored data from the memory to the designated remote facsimile modem.

8. A communications system as recited in claim 7, wherein the controller is selectively responsive to and controls the processing of each of (a), (b) and (c).

9. A communication system having a facsimile modem connectable between a first communications unit and a second communications unit, the facsimile modem comprising:

a memory; and a controller controlling the memory so that data received from the first communications unit for transmission to the second communications unit is stored in the memory when the second communications unit is not ready to receive the data.

10. A communications system as recited in claim 9, wherein:

the second communications unit comprises a terminal for receiving data;

the first communications unit comprises a remote communications party; and the controller controls the memory so that data received from the remote communications party is stored in the memory when the terminal is not ready to receive data.

11. A communications system as recited in claim 9, wherein:

the first communications unit comprises a terminal for transmitting data;

the second communications unit comprises a remote communications party; and the controller controls the memory so that data received from the terminal and designated by the terminal for transmitting to the remote communications party is stored in the memory when the designated remote communications party is not ready to receive the data.

12. A communications system as recited in claim 9, further comprising:

a terminal for transmitting and receiving data;

the first and second communications units comprising first and second remote communications parties, respectively; and the controller controlling the memory so that data received from the first remote communications party and which is to be transmitted, without passing through the terminal, to the second remote communications party when requested by the terminal, is stored in the memory and the controller sending a notification to the terminal indicating the data is received and further, in response to a request from the terminal to transmit the received and stored data to the second remote communications party, transmitting the received and stored data from the memory to the second remote communications party.

13. A data processing method for processing data in a facsimile modem connectable between a first communications unit and a second communications unit, the facsimile modem having a memory and the data processing method comprising:

determining whether the second communications unit is ready to receive data from the first communications unit; and storing the data received from the first communications unit in the memory provided in the facsimile modem when it is determined that the second communications unit is not ready to receive data.

14. A data processing method for processing data in a facsimile modem as recited in claim 13, wherein the second communications unit comprises a terminal receiving data and the first communications unit comprises a remote communications party, the method further comprising:

controlling the memory so that data received from the remote communications party is stored in the memory when the terminal is not ready to receive the data.

15. A data processing method for processing data in a facsimile modem as recited in claim 13, wherein the first communications unit comprises a terminal transmitting data and the second communications unit comprises a remote communications party, the method further comprising:

controlling the memory so that data to be transmitted from the terminal to the remote communications party is stored in the memory when the remote communications party is not ready to receive the data.

16. A data processing method for processing data in a facsimile modem as recited in claim 13, wherein the first and second communications units further comprise a first, remote communications party and second, remote communications party, respectively, and wherein the facsimile modem further comprises a terminal selectively transmitting and receiving data, the method further comprising:

controlling the memory so that data received from the first communications party and which is to be transmitted to the second remote communications party, without passing through the terminal, is stored in the memory;

sending a notification to the terminal indicating the data is received; and in response to a request from the terminal to transmit the received and stored data to the second communications party, transmitting the received and stored data from the memory to the second remote communications party.

* * * * *